(12) United States Patent
Noack et al.

(10) Patent No.: US 9,871,425 B2
(45) Date of Patent: Jan. 16, 2018

(54) ELECTRIC MACHINE

(75) Inventors: Felix Noack, Nürnberg (DE); Sebastian Weiss, Oberasbach (DE); Patric Willems, Postbauer-Heng (DE); Josef Zwack, Pocking (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 430 days.

(21) Appl. No.: 14/110,008

(22) PCT Filed: Mar. 13, 2012

(86) PCT No.: PCT/EP2012/054391
§ 371 (c)(1),
(2), (4) Date: Oct. 4, 2013

(87) PCT Pub. No.: WO2012/136453
PCT Pub. Date: Oct. 11, 2012

(65) Prior Publication Data
US 2014/0028124 A1    Jan. 30, 2014

(30) Foreign Application Priority Data

Apr. 6, 2011   (DE) .................. 10 2011 006 844

(51) Int. Cl.
*H02K 9/10*   (2006.01)
*H02K 9/04*   (2006.01)
(Continued)

(52) U.S. Cl.
CPC ............. *H02K 9/10* (2013.01); *H02K 9/18* (2013.01); *H02K 9/04* (2013.01); *H02K 9/06* (2013.01)

(58) Field of Classification Search
CPC .. H02K 9/10; H02K 9/18; H02K 9/00; H02K 9/12; H02K 9/04; H02K 9/06; H02K 5/20; H02K 5/12
(Continued)

(56) References Cited

U.S. PATENT DOCUMENTS 4,348,604 A  *  9/1982  Thode .................. H02K 9/18
                                                165/166
4,807,354 A  *  2/1989  Capuano ............. H02K 5/1672
                                                29/401.1
(Continued)

FOREIGN PATENT DOCUMENTS

AT       172875 T       4/1952
DE      2833034 A1      2/1980
(Continued)

OTHER PUBLICATIONS

JP10174369A (English Abstract).*
(Continued)

*Primary Examiner* — Bernard Rojas
*Assistant Examiner* — Alexander Moraza
(74) *Attorney, Agent, or Firm* — Henry M. Feiereisen LLC

(57) ABSTRACT

An electric machine includes a housing which accommodates a stator and a rotor rotationally supported about an axis of rotation, and has a front/rear air inlet opening on a top face and an air outlet opening therebetween. A front/rear air conveying element draws into the air inlet openings air which is discharged from the air outlet opening during operation. A cooler is mounted on the top face of the housing, covering the air inlet openings and the air outlet opening in a hood-like manner, such that discharged air is fed back to the air inlet openings. The cooler has a front/rear partition arranged between the air outlet opening and the
(Continued)

corresponding air inlet opening and extending upward from the top face. Air guiding elements are arranged in the housing and/or in the cooler for feeding discharged air at least partially to the respective other air inlet opening.

8 Claims, 5 Drawing Sheets

(51) Int. Cl.
*H02K 9/06* (2006.01)
*H02K 9/18* (2006.01)

(58) Field of Classification Search
USPC ...... 310/58, 59, 62, 63, 64, 65, 52, 60 R, 89
See application file for complete search history.

(56) References Cited

U.S. PATENT DOCUMENTS

| | | | | |
|---|---|---|---|---|
| 4,845,394 | A * | 7/1989 | Kleinhans | H02K 9/18 165/903 |
| 5,557,153 | A * | 9/1996 | Zimmermann | H02K 9/26 310/56 |
| 5,844,333 | A * | 12/1998 | Sheerin | F28D 1/03 165/124 |
| 6,396,176 | B1 * | 5/2002 | Mokri | H02K 9/18 310/58 |
| 2008/0238224 | A1 * | 10/2008 | Ressel | H02K 9/18 310/64 |

FOREIGN PATENT DOCUMENTS

| | | |
|---|---|---|
| DE | 2944751 A1 | 5/1981 |
| DE | 3703594 A1 | 9/1988 |
| DE | 3724186 A1 | 1/1989 |
| EP | 0299908 A1 | 1/1989 |
| JP | 58195447 A * | 11/1983 |
| JP | 10174369 A * | 6/1998 |
| JP | 2010288392 | 12/2010 |
| RU | 58813 U1 | 11/2006 |
| SU | 443442 A1 | 9/1974 |
| SU | 1403249 A1 | 6/1988 |
| SU | 1457082 A1 | 2/1989 |

OTHER PUBLICATIONS

JP58195447A (English Abstract).*
Sebastian Weiss, U.S. Pat. No. 7,923,871, Apr. 12, 2011, 2009-0273246, Nov. 5, 2009.
Sebastian Weiss, U.S. Pat. No. 8,026,643, Sep. 27, 2011, 2009-0230790, Sep. 17, 2009.
Sebastian Weiss et al., U.S. Pat. No. 8,283,817, Oct. 9, 2012, 2011-0006622, Jan. 13, 2011.
Thomas Hümer et al., U.S. Pat. No. 8,405,261, Mar. 26, 2013, 2011-0031831, Feb. 10, 2011.
Benjamin Eichinger et al., 2011-0127862, Jun. 2, 2011.
Konrad Brandl et al., U.S. Pat. No. 8,529,580, Aug. 27, 2013, 2011-0140550, Jun. 16, 2011.

* cited by examiner

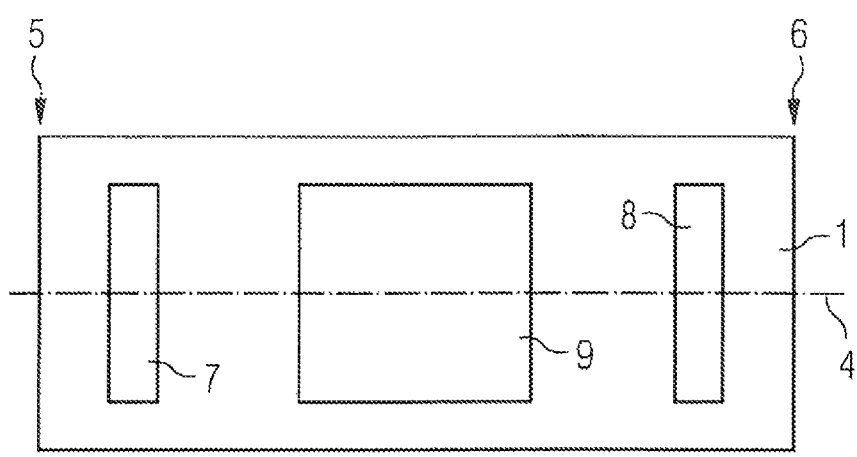
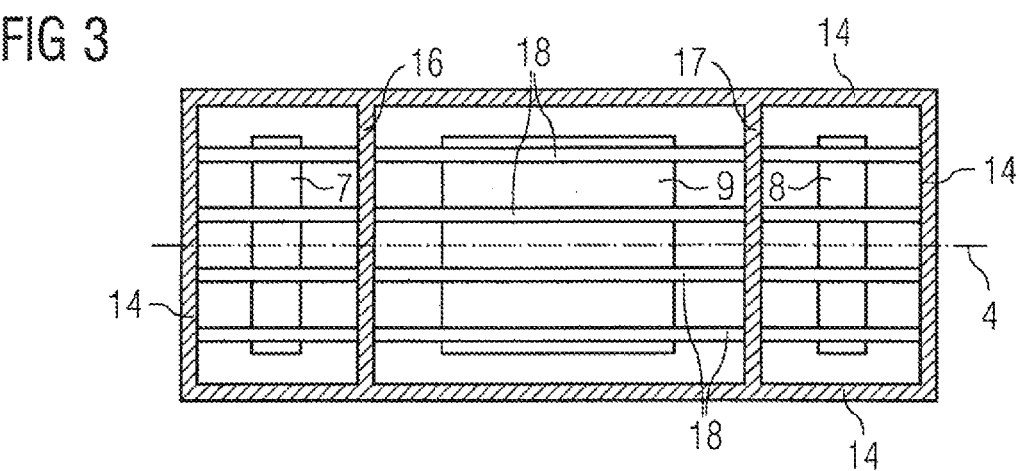
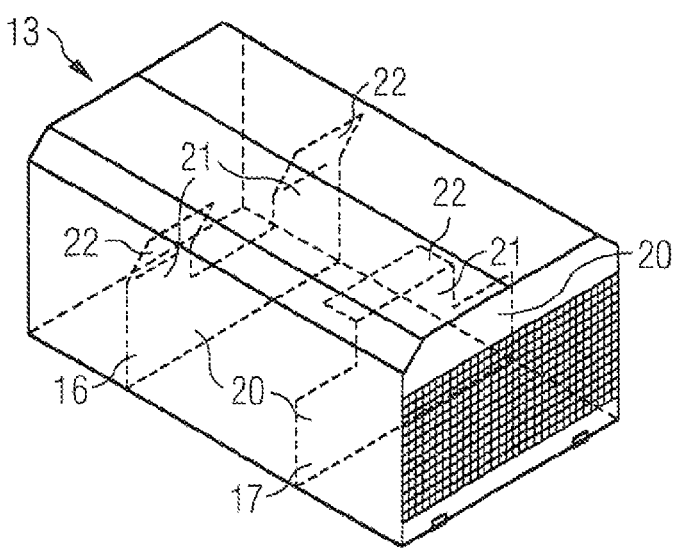

ELECTRIC MACHINE

CROSS-REFERENCES TO RELATED APPLICATIONS

This application is the U.S. National Stage of International Application No. PCT/EP2012/054391, filed Mar. 13, 2012, which designated the United States and has been published as International Publication No. WO 2012/136453 and which claims the priority of German Patent Application, Serial No. 10 2011 006 844.9, filed Apr. 6, 2011, pursuant to 35 U.S.C. 119(a)-(d).

BACKGROUND OF THE INVENTION

The present invention relates to an electric machine,
wherein the electric machine comprises a housing in which a stator is arranged and in which a rotor is rotationally supported about an axis of rotation,
wherein the housing extends from a front end to a rear end when viewed in the direction of the axis of rotation,
wherein on a top face the housing comprises a front air inlet opening in the vicinity of the front end, a rear air inlet opening in the vicinity of the rear end, and an air outlet opening therebetween,
wherein the electric machine comprises a front and a rear air conveying element by means of which air is drawn in at the front and the rear air inlet openings and discharged at the air outlet opening during operation of the electric machine,
wherein an auxiliary cooler is mounted on the top face of the housing, which auxiliary cooler covers the front and the rear air inlet openings and the air outlet opening with side walls and a top cover in a hood-like manner, such that the air discharged at the air outlet opening is fed back to the front and the rear air inlet openings,
wherein the auxiliary cooler comprises a front and a rear auxiliary partition,
wherein the front and the rear auxiliary partitions are arranged between the air outlet opening and the front and the rear air inlet openings and extend upward from the top face of the housing.

Such electric machines are generally known.

Electric machines having an auxiliary cooler are known in various embodiments. They are on the one hand divided into single-flow and double-flow machines in respect of the path of the primary air which flows through the electric machine. Single-flow electric machines have one air inlet opening in the vicinity of the front end and one air outlet opening in the vicinity of the rear end. Double-flow electric machines have—as explained above—an air inlet opening in the vicinity of each of the front end and of the rear end and an air outlet opening therebetween. Electric machines having an auxiliary cooler are furthermore subdivided in respect of the cooling of the primary air in the auxiliary cooler into electric machines in which the primary air is cooled by water and into electric machines in which the primary air is cooled by secondary air. The present invention relates to electric machines having an auxiliary cooler, in which machines the primary air is cooled by secondary air.

With regard to such electric machines, many tubes running parallel to the axis of rotation are present in the auxiliary cooler. The tubes are open to the outside. The air (primary air) discharged from the electric machine at the air outlet opening circulates around the tubes and as a result the tubes absorb the heat contained in the circulating primary air. This means that the tubes cool the primary air before the primary air is fed back to the electric machine. The secondary air flows through the tubes, thereby cooling the tubes, and the secondary air is thus heated.

The direction of flow of the secondary air is parallel to the axis of rotation, namely from the rear end toward the front end of the electric machine. Due to this circumstance the cooling capacity is greatest at the rear end of the auxiliary cooler, at which the secondary air is introduced into the tubes. The cooling effect at the front end is however smallest. According to the prior art the primary air fed to the front air inlet opening is therefore warmer than the primary air fed to the rear air inlet opening. Temperature differences of approximately 20 Kelvin result in practice.

The temperature differences occurring with regard to the primary air fed to the electric machine by way of the front and rear air inlet openings result in the electric machine being cooled less well in the front region than in the rear region. Due to this circumstance a performance level of the electric machine determined by its construction can often not be fully utilized. Furthermore, this results in a reduced service life for the electric machine. As a rule of thumb, an increase in temperature of 10 Kelvin results in a 50% reduction in the service life of the electric machine.

SUMMARY OF THE INVENTION

The object of the present invention consists in creating an electric machine in which the temperature differences between the air fed to the front air inlet opening and the air fed to the rear air inlet opening are at least reduced, as far as possible even completely compensated for.

The object is achieved by an electric machine having a housing in which a stator is arranged and in which a rotor is rotationally supported about an axis of rotation, wherein the housing extends from a front end to a rear end when viewed in the direction of the axis of rotation, wherein on a top face the housing comprises a front air inlet opening in the vicinity of the front end, a rear air inlet opening in the vicinity of the rear end, and an air outlet opening therebetween, wherein the electric machine comprises a front and a rear air conveying element by which air is drawn in at the front and the rear air inlet openings and discharged at the air outlet opening during operation of the electric machine, wherein an auxiliary cooler is mounted on the top face of the housing, which auxiliary cooler covers the front and the rear air inlet openings and the air outlet opening with side walls and a top cover in a hood-like manner, such that the air discharged at the air outlet opening is fed back to the front and the rear air inlet openings, wherein the auxiliary cooler includes a front and a rear auxiliary partition, wherein the front and the rear auxiliary partitions are arranged between the air outlet opening and the front and the rear air inlet openings and extend upward from the top face of the housing, wherein air guiding elements are arranged in the housing and/or in the auxiliary cooler, by the air discharged at the region of the air outlet opening facing the front air inlet opening is fed at least partially to the rear air inlet opening and the air discharged at the region of the air outlet opening facing the rear air inlet opening is fed at least partially to the front air inlet opening.

Advantageous embodiments of the electric machine according to the invention are set down in the dependent claims.

According to the invention, provision is made in the case of an electric machine of the type mentioned in the introduction that air guiding elements are arranged in the housing and/or in the auxiliary cooler, by means of which the air discharged at the region of the air outlet opening facing the front air inlet opening is fed at least partially to the rear air inlet opening and the air discharged at the region of the air outlet opening facing the rear air inlet opening is fed at least partially to the front air inlet opening.

BRIEF DESCRIPTION OF THE DRAWING

In order to implement the air guiding elements it is for example possible that the front and the rear auxiliary partitions each have at least one first region and one second region when viewed at right angles to the axis of rotation, that the first regions are distanced further away than the second regions from the top cover of the auxiliary cooler and that when viewed in the direction of the axis of rotation the first regions of the front and the rear auxiliary partitions are situated opposite the second regions of the respective other auxiliary partition.

In particular, provision can be made in the case of this embodiment that the air guiding elements comprise air delivery elements arranged in the region of the upper ends of the second regions, by means of which at least one part of the air discharged in the region of the air outlet opening facing the front and the rear air inlet openings is deflected in the direction of the first region, situated opposite when viewed in the direction of the axis of rotation, of the respective other auxiliary partition. Alternatively or in addition, it is possible that the second regions and/or the air delivery elements arranged in the region of the upper ends of the second regions extend up to the top cover of the auxiliary cooler. As a result of this measure it is possible to specifically deflect the primary air flowing out of the air outlet opening toward the one or the other auxiliary partition in the region between the two auxiliary partitions.

Figure 1:
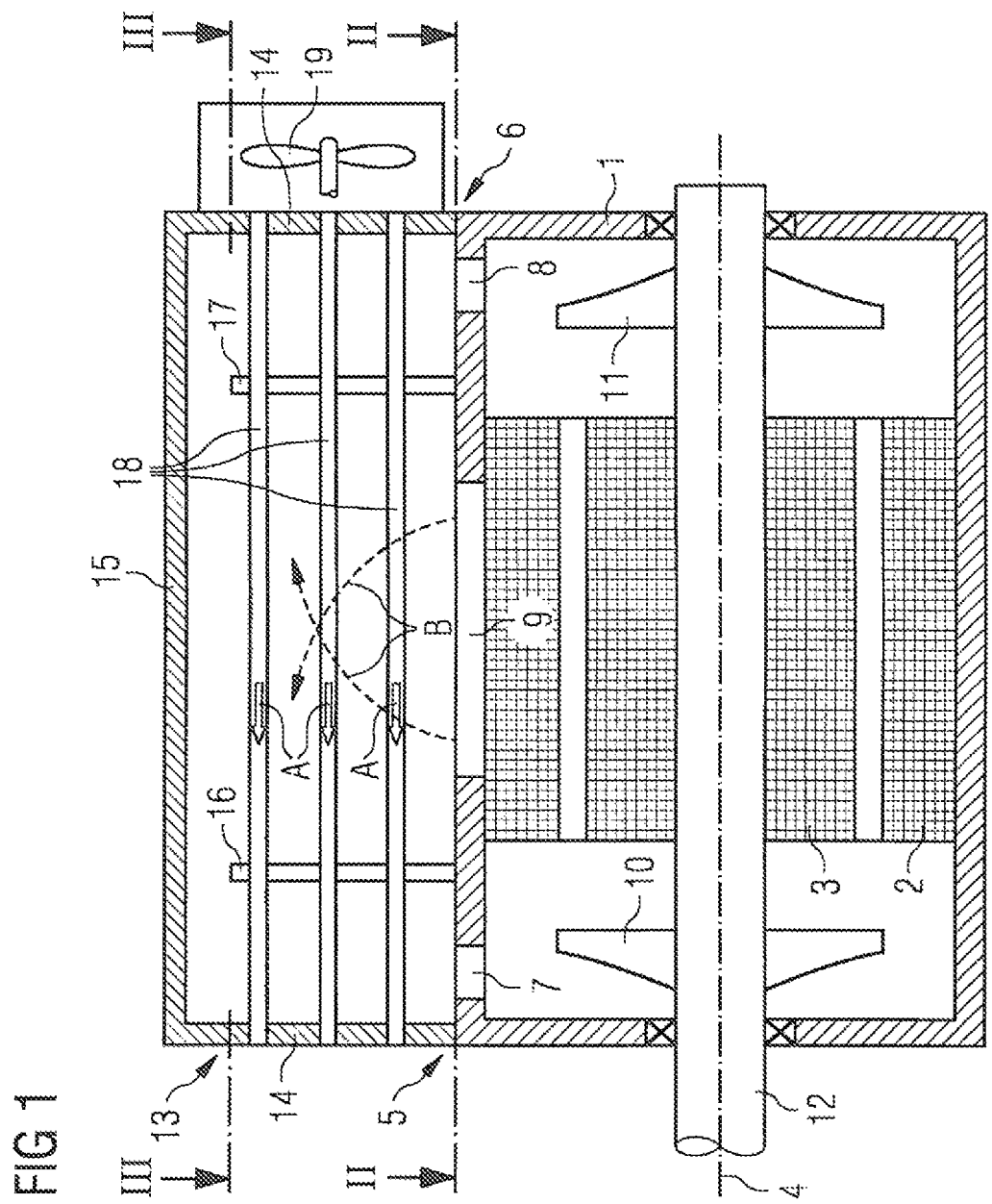

It is furthermore possible that the air guiding elements comprise a number of axial partitions arranged in the auxiliary cooler, each of which runs from the front auxiliary partition to the rear auxiliary partition. As a result of this measure it is possible to implement in the auxiliary cooler between the auxiliary partitions air flows separate from one another which do not mix with one another.

Alternatively or in addition, it is possible that the air guiding elements comprise a housing partition arranged in the housing, that the housing partition is arranged in such a manner that it divides the air outlet opening into a first and a second cross-sectional region, that the air drawn in by way of the front air inlet opening is discharged from the air outlet opening in the first cross-sectional region of the air outlet opening and the air drawn in by way of the rear air inlet opening is discharged from the air outlet opening in the second cross-sectional region of the air outlet opening, and that the first cross-sectional region of the air outlet opening is arranged at least partially in the region of the air outlet opening facing the front air inlet opening and the second cross-sectional region of the air outlet opening is arranged at least partially in the region of the air outlet opening facing the rear air inlet opening.

As a result of this measure, a mixing of the primary air fed to the electric machine by way of the air inlet openings is avoided inside the housing. The two air flows therefore enter the auxiliary cooler at defined positions of the air outlet opening.

The housing partition can be arranged as required. In the simplest case it is possible that the housing partition runs essentially at right angles to the axis of rotation in the region of the air outlet opening. In this case, it is ensured that the air fed to the electric machine by way of the front air inlet opening is discharged fully at the region of the air outlet opening facing the front air inlet opening. The same applies by analogy in this case for the air fed to the electric machine by way of the rear air inlet opening.

In a particularly preferred embodiment of the present invention provision is made that the air guiding elements are designed in such a manner that together with the auxiliary partitions they form two flow channels which are separate from one another, that the air discharged from the air outlet opening in the region of the air outlet opening facing the front air inlet opening and the air discharged from the air outlet opening in the region of the air outlet opening facing the rear air inlet opening is in each case blown into one of the flow channels, and that the air blown into the flow channels is fed by means of the respective flow channel to the respective other air inlet opening. The flow channels may cross, in particular when viewed in the vertical direction, beneath tubes for secondary air running in the auxiliary cooler.

In order to implement the flow channels it is for example possible that the air guiding elements comprise a transverse partition, that the transverse partition runs at right angles to the axis of rotation and separates the region of the air outlet opening facing the front air inlet opening and the region of the air outlet opening facing the rear air inlet opening from one another, that the air guiding elements between the auxiliary partitions and the transverse partition each comprise one separating element, that when viewed in the direction of the axis of rotation the separating elements extend from the respective auxiliary partition to the transverse partition and when viewed at right angles to the axis of rotation extend from side wall to side wall of the auxiliary cooler, that when viewed at right angles to the axis of rotation separating elements are stepped and/or ramped in opposite directions from bottom to top and that when viewed in the vertical direction the transverse partition is interrupted between the separating elements.

The embodiment last described can in particular be combined with the presence of the housing partition. In this case, the line of the transverse partition preferably corresponds to the line of the housing partition.

Figure 5:
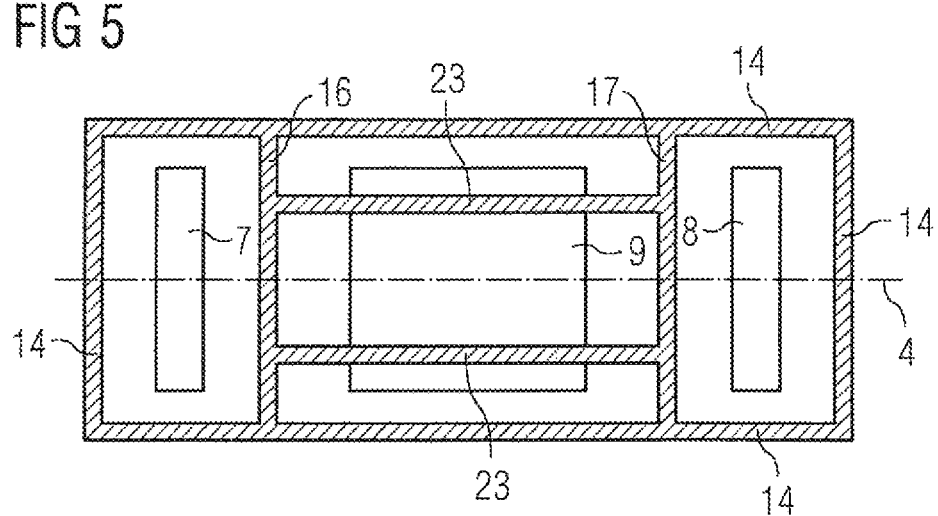
Figure 6:
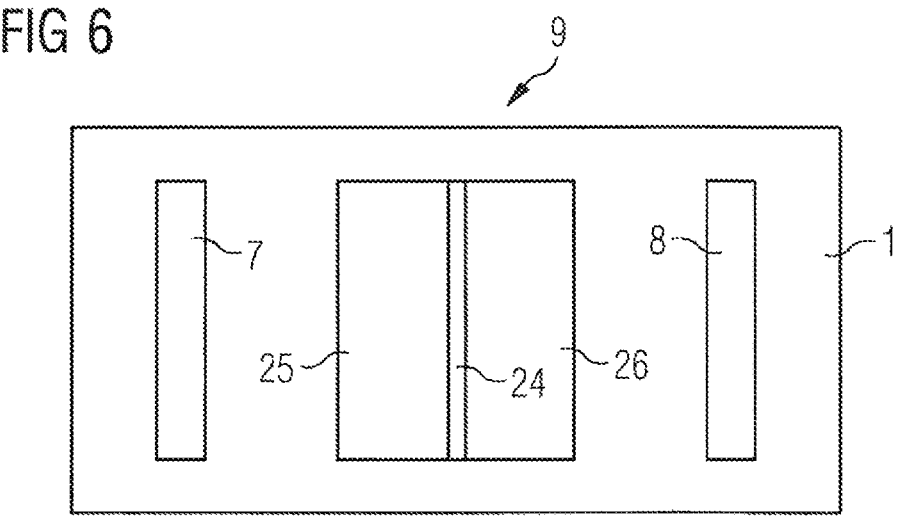
Figure 7:
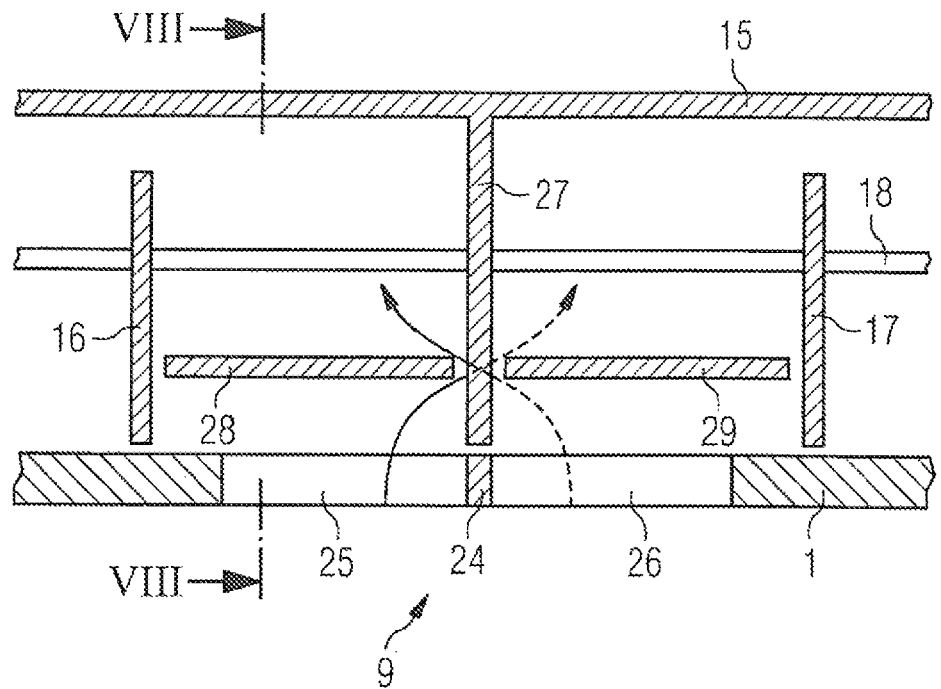
Figure 8:
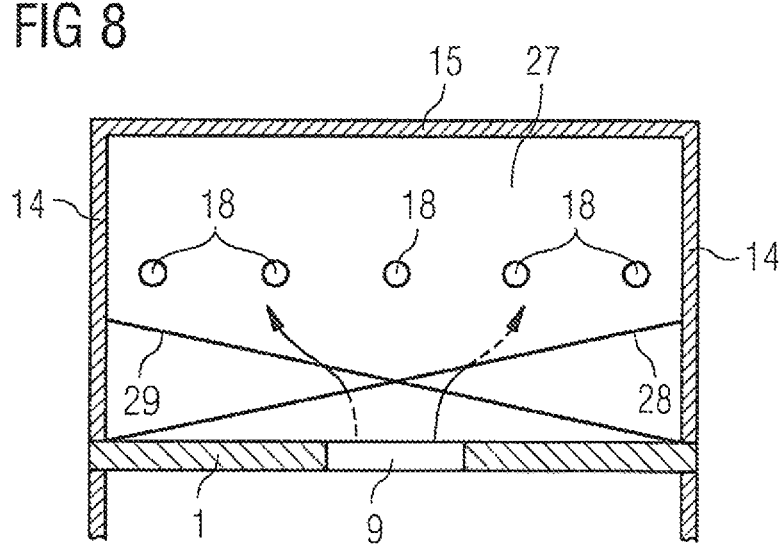
Figure 9:
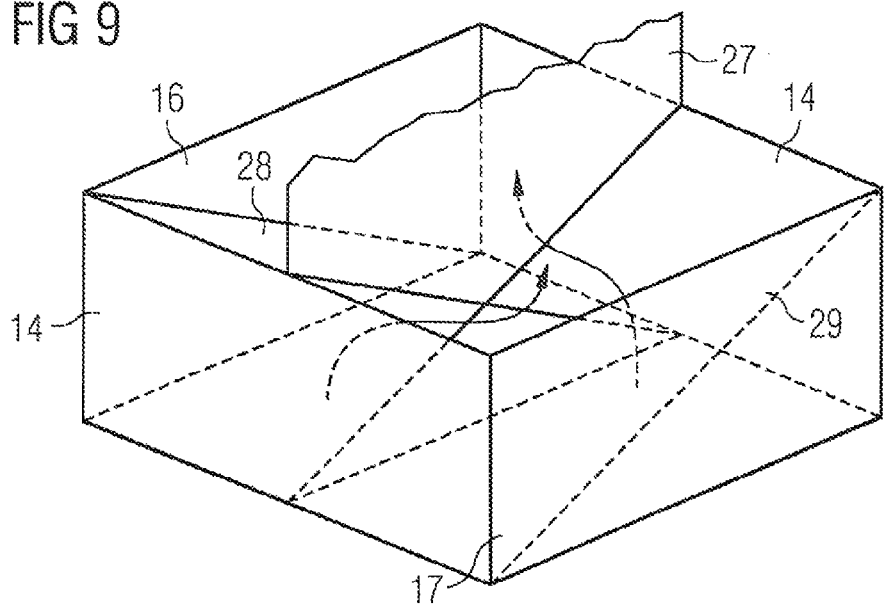
Figure 10:
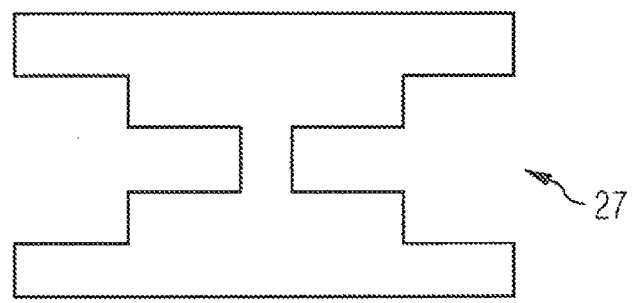
Figure 11:
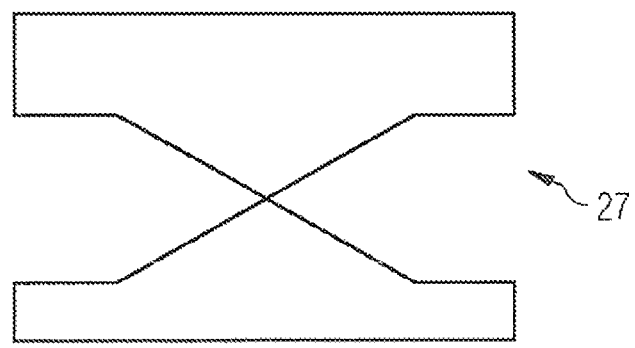

Further advantages and details will emerge from the following description of exemplary embodiments in conjunction with the drawings. In the schematic drawings:

FIG. 1 schematically shows an electric machine having an auxiliary cooler,

FIG. 2 schematically shows a top view of the electric machine from FIG. 1,

FIG. 3 schematically shows a section through the auxiliary cooler from FIG. 1,

FIG. 4 schematically shows a perspective view of an auxiliary cooler according to the invention, FIG. 5 schematically shows a section analogous to FIG. 3 through an auxiliary cooler according to the invention, FIG. 6 schematically shows a top view analogous to FIG. 2 of an electric machine embodied according to the invention, FIG. 7 schematically shows a section analogous to FIG. 1 through an auxiliary cooler according to the invention, FIG. 8 schematically shows a section along a line VIII-VIII in FIG. 7, FIG. 9 schematically shows a perspective illustration of a part of the auxiliary cooler from FIG. 7 and FIGS. 10 and 11 schematically show possible alternative designs of separating elements.

DETAILED DESCRIPTION OF PREFERRED EMBODIMENTS

In accordance with FIGS. 1 to 3 an electric machine has a housing 1. A stator 2 is arranged in the housing 1. A rotor 3 is furthermore mounted in the housing 1. The rotor 3 is capable of rotation about an axis of rotation 4.

The housing 1 extends from a front end 5 to a rear end 6 when viewed in the direction of the axis of rotation 4. According to the illustration shown in FIG. 1, the front end 5 of the housing 1 is the drive-side end of the electric machine while the rear end 6 is the operator-side end of the electric machine. This is however not relevant to the invention. The reverse could equally apply.

The housing 1 comprises on a top face a front air inlet opening 7, a rear air inlet opening 8 and an air outlet opening 9. The front air inlet opening is arranged in the vicinity of the front end 5, the rear air inlet opening 8 in the vicinity of the rear end 6. The air outlet opening 9 is arranged between the two air inlet openings 7, 8.

The electric machine comprises a front air conveying element 10 and a rear air conveying element 11. By means of the front air conveying element 10 air is drawn in at the front air inlet opening 8 during operation of the electric machine, blown through the electric machine and discharged at the air outlet opening 9. In similar fashion, by means of the rear air conveying element 11 air is drawn in at the rear air inlet opening 8 and discharged at the air outlet opening 9 during operation of the electric machine. The air conveying elements 10, 11 are as a general rule designed as fans which are likewise arranged in rotatably fixed fashion on a rotor shaft 12 on which the rotor 3 is arranged in rotatably fixed fashion. Alternatively, the air conveying elements 10, 11 can be implemented by the rotor 3 itself.

An auxiliary cooler 13 is mounted on the top face of the housing 1. The auxiliary cooler 13 comprises side walls 14 and a top cover 15 in accordance with FIGS. 1 and 3. The auxiliary cooler 13 covers the front and the rear air inlet openings 7, 8 and the air outlet opening 9 in a hood-like manner. The air discharged at the air outlet opening 9 is therefore fed back to the front and the rear air inlet openings 7, 8.

The auxiliary cooler 13 comprises—see particularly clearly FIG. 1—a front and a rear auxiliary partition 16, 17. The auxiliary partitions 16, 17 are arranged according to FIGS. 1 and 3 between the air outlet opening 9 and the front air inlet opening 7 on the one hand and the air outlet opening 9 and the rear air inlet opening 8 on the other hand.

They extend upward from the top face of the housing 1. The air discharged from the air outlet opening 9 must therefore firstly rise upward between the two auxiliary partitions 16, 17 before it can flow across the auxiliary partitions 16, 17 downward again to the air inlet openings 7, 8.

There are furthermore tubes 18 running in the auxiliary cooler 13. Secondary air is directed through the tubes 18, as indicated in FIG. 1 by arrows A. For example, a corresponding fan element 19 can be present for this purpose.

Due to the direction of flow of the secondary air—which in the present case is directed from the rear end to the front end 6, 5—the cooling effect of the secondary air in the vicinity of the rear end 6 is greater than in the vicinity of the front end 5. In the prior art, this results in temperature differences of approximately 20 Kelvin between the primary air fed to the electric machine by way of the front air inlet opening 7 and the primary air fed to the electric machine by way of the rear air inlet opening 8. In order to reduce and where possible completely compensate for said temperature differences, according to the invention air guiding elements are arranged in the housing 1 and/or in the auxiliary cooler 13. By means of the air guiding elements—see the corresponding dashed arrows B in FIG. 1—a crossing of the air flows is effected. The air which is discharged at the region of the air outlet opening 9 facing the front air inlet opening 7 is therefore fed at least partially to the rear air inlet opening 8. In similar fashion, the air which is discharged at the region of the air outlet opening 9 facing the rear air inlet opening 8 is fed at least partially to the front air inlet opening 7. How this is achieved and how the corresponding air guiding elements can be embodied will be described in detail in the following in conjunction with FIGS. 4 to 11 in which the tubes 18 are either entirely or partially omitted from the illustration in order to give a better overview.

According to FIG. 4, when viewed at right angles to the axis of rotation 4 the front and the rear auxiliary partitions 16, 17 each have at least one first region 20 and at least one second region 21. The first regions 20 are distanced further away than the second regions 21 from the top cover 15 of the auxiliary cooler 13. In particular, the second regions 21 can extend up to the top cover 15 of the auxiliary cooler 13 while the first regions 20 are distanced away from the top cover 15 of the auxiliary cooler 13.

According to FIG. 4, when viewed in the direction of the axis of rotation 4 the first regions 20 of both auxiliary partitions 16, 17 are situated opposite the second regions 21 of the respective other auxiliary partition 17, 16. In some cases this embodiment can itself be sufficient in order to effect the air guidance according to the invention. As a general rule, however, air delivery elements 22 are arranged in the region of the upper ends of the second regions 21. By means of the air delivery elements 22, which are arranged at the second regions 21 of the front auxiliary partition 16, one part of the air discharged in the region of the air outlet opening 9 facing the front air inlet opening 7 is deflected in the direction of the first region 20 of the rear auxiliary partition 17 situated opposite when viewed in the direction of the axis of rotation 4. In similar fashion, by means of the air delivery elements 22, which are arranged in the region of the upper end of the second region 21 of the rear auxiliary partition 17, one part of the air discharged in the region of the air outlet opening 9 facing the rear air inlet opening 8 is deflected in the direction of the first region 20 of the front auxiliary partition 16 situated opposite when viewed in the direction of the axis of rotation 4.

In the case that the second regions 21 do not extend up to the top cover 15 of the auxiliary cooler 13, it is preferred that the air delivery elements 22 arranged there extend up to the top cover 15 of the auxiliary cooler 13. Alternatively, however, a clearance may also remain here.

It is possible that the air delivery elements 22 deflect the air flowing to them directly by 90°. Alternatively, a deflection by a smaller angle is possible, for example by approximately 45 to 70°. A gradual deflection is also possible.

Alternatively or in addition to the embodiment according to FIG. 4 it is possible that the air guiding elements according to FIG. 5 comprise a number of axial partitions 23 which are arranged in the auxiliary cooler 13. The axial partitions 23 in this case each run according to FIG. 5 from the front to the rear auxiliary partition 16, 17.

In a further embodiment the air guiding elements according to FIG. 6 comprise a housing partition 24. The housing partition 24 is, as the name suggests, arranged in the housing 1 of the electric machine. Said embodiment can be implemented as required in isolation or in combination with the embodiments of FIGS. 4 and/or 5.

The housing partition 24 is arranged in such a manner that it divides the air outlet opening 9 into a first and a second cross-sectional region 25, 26. The air drawn in by way of the front air inlet opening 7 is discharged in the first cross-sectional region 25 from the air outlet opening 9. In similar fashion, the air drawn in by way of the rear air inlet opening 8 is discharged in the second cross-sectional region 26 from the air outlet opening 9.

With regard to the embodiment according to FIG. 6, in the region of the air outlet opening 9 the housing partition 24 runs essentially at right angles to the axis of rotation 4. The first cross-sectional region 25 is therefore arranged completely in the region of the air outlet opening 9 facing the front air inlet opening 7. In similar fashion, with regard to the embodiment from FIG. 6, the second cross-sectional region 26 is arranged completely in the region of the air outlet opening 9 facing the rear air inlet opening 8. The embodiment according to FIG. 6 is in particular expedient in the situation when on the one hand the auxiliary partitions 16, 17 are divided into the first and second regions 20, 21, the air delivery elements 22 are present at the second regions 21 and the axial partitions 23 are arranged in each case in the transitional region from first to second region 20, 21 of the auxiliary partitions 16, 17.

FIGS. 7 to 9 show a further possible embodiment of the auxiliary cooler 13. According to FIGS. 7 to 9 the air guiding elements 27 to 29 are designed in such a manner that together with the auxiliary partitions 16, 17 they form two flow channels which are separate from one another. The air which is fed to the electric machine by way of the front air inlet opening 7 is discharged from the air outlet opening 9 in the region 25 of the air outlet opening 9 facing the front air inlet opening 7. The air which is fed to the electric machine by way of the rear air inlet opening 8 is discharged from the air outlet opening 9 in the region 26 of the air outlet opening 9 facing the rear air inlet opening 8. This applies especially if the housing partition 24 is present in the housing 1 in accordance with the illustration in FIG. 7.

The air discharged from the air outlet opening 9 in the respective region 25, 26 is in each case blown into one of the flow channels according to FIGS. 7 to 9. The air blown into the flow channels—shown in FIGS. 7 to 9 by corresponding, partially dashed arrows—is fed by means of the respective flow channel to the respective other air inlet opening 8, 7.

In order to be able to feed the air to the respective other air inlet opening 8, 7 the flow channels must cross. The height at which the flow channels cross is in principle freely selectable. The flow channels preferably cross in the auxiliary cooler 13 beneath the tubes 18. In order to illustrate this the lowermost row of tubes 18 is included in the drawing in FIG. 8. This embodiment in particular has the advantage that the air crossing can be produced by means of a separate component which is arranged between the electric machine and the auxiliary cooler 13.

In order to implement the flow channels the air guiding elements 27 to 29 can comprise a transverse partition 27 and two separating elements 28, 29.

The transverse partition 27 runs at right angles to the axis of rotation 4. It separates the region 25 of the air outlet opening 9 facing the front air inlet opening 7 and the region 26 of the air outlet opening 9 facing the rear air inlet opening 8 from one another, in that case that the housing partition 24 is present in the housing 1 of the electric machine and runs at right angles to the axis of rotation 4, the line of the transverse partition 27 corresponds to the line of the housing partition 24. A possible distance of the transverse partition 27 from the housing partition 24 should be as small as possible (or 0).

The separating element 28 (front separating element 28) is arranged between the front auxiliary partition 16 and the transverse partition 27. The separating element 29 (rear separating element 29) is arranged between the rear auxiliary partition 17 and the transverse partition 27. When viewed in the direction of the axis of rotation 4, the separating elements 28, 29 extend from the respective auxiliary partition 16, 17 to the transverse partition 27. Possible distances of the separating elements 28, 29 to the auxiliary partitions 16, 17 and to the transverse partition 27 should be as small as possible (or 0). When viewed at right angles to the axis of rotation 4, the separating elements 28, 29 extend from side wall 14 to side wall 14 of the auxiliary cooler 13. Possible distances of the separating elements 28, 29 to the side walls 14 of the auxiliary cooler 13 should be as small as possible (or 0).

When viewed at right angles to the axis of rotation 4, according to FIGS. 8 and 9 the separating elements 28, 29 are ramped in opposite directions from bottom to top. Alternatively, the separating elements 28, 29 could be stepped—see FIG. 10—or mixed stepped and ramped—see FIG. 11.

When viewed in the vertical direction the transverse partition 27 is self-contained in the regions in which it runs both above the front separating element 28 and also above the rear separating element 29. Similarly, when viewed in the vertical direction the transverse partition 27 is self-contained in the regions in which it runs both below the front separating element 28 and also below the rear separating element 29. In the region which when viewed in the vertical direction lies between the two separating elements 28, 29 the transverse partition 27 is interrupted. This means that the air which exits from the regions 25, 26 from the air outlet opening 9 can switch to the respective other side in this height region.

The present invention has many advantages. In particular, with a relatively simple structure a significant reduction is achieved in the temperature differences between the front and the rear end 5, 6 of the electric machine, in some cases even an almost complete elimination thereof.

The above description serves only to illustrate the present invention. The scope of protection of the present invention is however to be determined solely by the appended claims.

What is claimed is:

1. An electric machine, comprising:
   a housing having a front end and a rear end, said housing having a top face provided with a front air inlet opening in a vicinity of the front end, a rear air inlet opening in a vicinity of the rear end, and an air outlet opening extending the front air inlet opening and the rear air inlet opening;
   a stator arranged in the housing;
   a rotor supported in the housing for rotation about an axis of rotation;
   front and rear air conveying elements configured for drawing in air at the front and rear air inlet openings and for discharging air at the air outlet opening during operation of the electric machine;

a cooler mounted on the top face of the housing and having side walls and a top cover that covers the front and rear air inlet openings and the air outlet opening provided between the housing and the cooler, such that air discharged through the air outlet opening from the housing into the cooler is fed back through the front and rear air inlet openings from the cooler into the housing, said cooler including a front partition arranged between the air outlet opening and the front air inlet opening, and a rear partition arranged between the air outlet opening and the rear air inlet opening, said front and rear partitions extending vertically upward from the top face of the housing in the cooler so that air discharged from the air outlet opening must firstly rise upwards between the partitions in the cooler and then it can flow across the partitions in the cooler downwards again to the air inlet openings; and air delivery elements extending from the partitions in the cooler and configured to feed air discharged at a region of the air outlet opening facing the front air inlet opening to the rear air inlet opening and to feed air discharged at a region of the air outlet opening facing the rear air inlet opening to the front opening, said delivery elements extending from upper ends of the partitions in the cooler, and being inclined at an angle relative to the partitions, wherein the air delivery elements are arranged in a region of upper ends of second regions and configured to deflect the air flowing to the air delivery elements by 45° to 70° or at least part of the air discharged in the region of the air outlet opening facing the front and rear air inlet openings in a direction of first regions of the partitions situated opposite when viewed in the direction of the axis of rotation, wherein the air delivery elements together with the front and rear partitions form two separate flow channels, wherein air discharged from the air outlet opening in the region of the air outlet opening facing the front air inlet opening is blown into one of the flow channels for feeding to rear air inlet opening, and air discharged from the air outlet opening in the region of the air outlet opening facing the rear air inlet opening is blown into the other one of the flow channels for feeding to the front air inlet opening, and wherein the air delivery elements comprise a transverse partition which extends at a right angle to the axis of rotation and separates the region of the air outlet opening facing the front air inlet opening and the region of the air outlet opening facing the rear air inlet opening from one another, said air delivery elements having each a separating element between the front and rear partitions and the transverse partition, said separating elements of the front and rear partitions extending, when viewed in the direction of the axis of rotation, from the front and rear partitions to the transverse partition, and, when viewed at a right angle to the axis of rotation, from side wall to side wall of the cooler, wherein the separating elements, when viewed at a right angle to the axis of rotation, are stepped or ramped in opposite directions from bottom to top, and the transverse partition, when viewed in a vertical direction, is interrupted between the separating elements.

2. The electric machine of claim 1, wherein each of the front and rear partitions has first and second regions when viewed at a right angle to the axis of rotation, with the first regions of the front and rear partitions being spaced from the top cover of the cooler at a distance which is greater than a distance of the second regions to the cover of the cooler, wherein, when viewed in a direction of the axis of rotation, the first region of the front partition is situated opposite the second region of the rear partition, and the first region of the rear partition is situated opposite the second region of the front partition.

3. The electric machine of claim 2, wherein at least one member selected from the group consisting of the second regions of the front and rear partitions and the air delivery elements arranged in the region of the upper ends of the second regions is sized to extend up to the top cover of the cooler.

4. The electric machine of claim 1, wherein the air delivery elements comprise a number of axial partitions arranged in the cooler, each said axial partition extending from the front partition to the rear partition.

5. The electric machine of claim 1, wherein the air delivery elements comprise a housing partition arranged in the housing such as to divide the air outlet opening into first and second cross-sectional regions, wherein air drawn in by way of the front air inlet opening is discharged from the air outlet opening in the first cross-sectional region of the air outlet opening and air drawn in by way of the rear air inlet opening is discharged from the air outlet opening in the second cross-sectional region of the air outlet opening, said first cross-sectional region of the air outlet opening being arranged at least partially in the region of the air outlet opening facing the front air inlet opening, and the second cross-sectional region of the air outlet opening being arranged at least partially in the region of the air outlet opening facing the rear air inlet opening.

6. The electric machine of claim 5, wherein the housing partition extends essentially at a right angle to the axis of rotation in the region of the air outlet opening.

7. The electric machine of claim 5, wherein the air delivery elements comprise a transverse partition which extends at a right angle to the axis of rotation and separates the region of the air outlet opening facing the front air inlet opening and the region of the air outlet opening facing the rear air inlet opening from one another, said transverse partition having a profile which corresponds to a profile of the housing partition.

8. The electric machine of claim 1, wherein when viewed in a vertical direction the flow channels cross beneath tubes for secondary air running in the cooler.

* * * * *